US011506250B1

(12) United States Patent
Green et al.

(10) Patent No.: US 11,506,250 B1
(45) Date of Patent: Nov. 22, 2022

(54) CLUTCH-BY-WIRE INTEGRATION INCLUDING HUMAN OVERRIDE

(71) Applicant: TOYOTA RESEARCH INSTITUTE, INC., Los Altos, CA (US)

(72) Inventors: Alexander R. Green, Redwood City, CA (US); Michael Thompson, San Juan Capistrano, CA (US); Yan Ming Jonathan Goh, Palo Alto, CA (US); John Subosits, Menlo Park, CA (US); Avinash Balachandran, Sunnyvale, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 0 days.

(21) Appl. No.: 17/365,796

(22) Filed: Jul. 1, 2021

(51) Int. Cl.
*F16D 48/06* (2006.01)
*F16D 25/08* (2006.01)
*F16D 48/02* (2006.01)

(52) U.S. Cl.
CPC ......... *F16D 48/066* (2013.01); *F16D 25/087* (2013.01); *F16D 2048/023* (2013.01); *F16D 2048/0221* (2013.01); *F16D 2048/0254* (2013.01); *F16D 2048/0263* (2013.01); *F16D 2500/1027* (2013.01); *F16D 2500/3024* (2013.01); *F16D 2500/31413* (2013.01);
(Continued)

(58) Field of Classification Search
None
See application file for complete search history.

(56) References Cited

U.S. PATENT DOCUMENTS

| 4,116,214 A | 9/1978 | Koch |
| 2004/0172184 A1 | 9/2004 | Vukovich |

(Continued)

FOREIGN PATENT DOCUMENTS

| CN | 102767581 A | * 11/2012 | ...... B60W 30/18072 |
| CN | 103307137 | 9/2013 |

(Continued)

OTHER PUBLICATIONS

Grainger On-line Catalogue, ARO Shuttle Valve, 1/4 in NPT Valve Inlet Port, 200 psi (the ARO Shuttle Valve).

*Primary Examiner* — Timothy Hannon
(74) *Attorney, Agent, or Firm* — Sheppard, Mullin, Richter & Hampton LLP; Hector A. Agdeppa; Daniel N. Yannuzzi

(57) ABSTRACT

Systems and methods of controlling a clutch in a vehicle are provided. With the goal of enabling autonomous/assisted control of the clutch by an electronic control unit while preserving the familiar mechanical feeling at the clutch pedal that driving enthusiasts prefer, embodiments of the disclosed technology use a shuttle valve to blend control of clutch engagement between a driver and an ECU. In these embodiments, a clutch pedal in the vehicle may be mechanically connected to a piston in a first hydraulic cylinder (just like in a traditional mechanical/hydraulic clutch actuation system), and an ECU may actuate a second hydraulic cylinder. Accordingly, a shuttle valve may be used to route the fluid coming from the cylinder with the greater pressure (i.e. the driver actuated cylinder or the ECU actuated cylinder), to a third hydraulic cylinder which adjusts engagement of a clutch by a mechanical linkage.

12 Claims, 5 Drawing Sheets

(52) U.S. Cl.
CPC ............... *F16D 2500/7041* (2013.01); *F16D 2500/70406* (2013.01)

(56) References Cited

U.S. PATENT DOCUMENTS

| | | | | |
|---|---|---|---|---|
| 2014/0012474 A1* | 1/2014 | Ruebsam | ................ | F16D 48/06 |
| | | | | 701/68 |
| 2014/0350809 A1* | 11/2014 | Tamaru | ................ | B60W 30/09 |
| | | | | 701/67 |
| 2016/0017994 A1 | 1/2016 | Suzumura | | |

FOREIGN PATENT DOCUMENTS

| | | | | | |
|---|---|---|---|---|---|
| DE | 102017200767 A1 | * | 7/2018 | ........... | F16D 48/066 |
| EP | 1927776 A2 | * | 6/2008 | ............ | F16D 48/02 |
| GB | 1311811 A | * | 3/1973 | ............ | F16D 25/14 |
| JP | 11173346 A | | 6/1999 | | |
| KR | 0138524 Y1 | * | 4/1999 | | |
| KR | 100501246 | | 7/2005 | | |
| KR | 101905381 | | 10/2018 | | |
| TW | 200813354 | | 3/2008 | | |

\* cited by examiner

CLUTCH-BY-WIRE INTEGRATION INCLUDING HUMAN OVERRIDE

TECHNICAL FIELD

The present disclosure relates generally to automotive systems and technologies, and more particularly, some embodiments relate to blended control of clutch engagement between a driver of a vehicle and an electronic control unit in the vehicle.

DESCRIPTION OF RELATED ART

In manual transmission vehicles, a clutch may be used to selectively interrupt the flow of power between the internal combustion engine and the drivetrain of a vehicle. This may be done while changing gears, and when the vehicle is stopped but the internal combustion engine is still running.

BRIEF SUMMARY OF THE DISCLOSURE

According to various embodiments of the disclosed technology, a method for blending control of clutch engagement between a driver and an electronic control unit (ECU) is provided. The method, in accordance with embodiments of the technology disclosed herein comprises: (1) receiving at a hydraulic-mechanical linkage, at least one of a first fluid compressed by clutch-related input signals from a driver of a vehicle, and a second fluid compressed by clutch-related input signals from an ECU in the vehicle; and (2) adjusting by the hydraulic-mechanical linkage, engagement of a clutch in accordance with one of the first or second fluids having a greater pressure. In some embodiments the clutch-related input signals from the driver may comprise the driver pushing a clutch pedal which is mechanically connected to a piston in a driver controlled hydraulic cylinder. In certain embodiments, the clutch-related input signals from the ECU may comprise the ECU sending control signals to an electronic actuator configured to, in response to the control signals, compress fluid in an ECU controlled hydraulic cylinder.

In various embodiments, a vehicle system which enables blended control of clutch engagement between a driver and an ECU is provided. The system, in accordance with embodiments of the technology disclosed herein comprises: (1) a clutch; (2) an ECU and; (3) a shuttle valve. The shuttle valve may comprise first and second inlets and an outlet, and may operate to: in response to receiving clutch-related input signals from a driver of the vehicle and the ECU, routing fluid to the first and second inlets of the shuttle valve respectively, route the fluid from the greater pressure source through the outlet, to a piston in a hydraulic cylinder which adjusts engagement of the clutch based on fluid pressure. In some embodiments, the clutch-related input signals from the driver may comprise the driver pushing a clutch pedal which is mechanically connected to a piston in a driver controlled hydraulic cylinder. In certain embodiments, clutch-related input signals from the ECU may comprise the ECU sending control signals to an electronic actuator configured to, in response to the control signals, compress fluid in an ECU controlled hydraulic cylinder. Finally, in some embodiments, the vehicle system may further comprise: (1) a first pressure sensor which communicates, to the ECU, the pressure of the fluid routed to the first inlet of the shuttle valve; and (2) a second pressure sensor which communicates, to the ECU, the pressure of the fluid routed through the outlet of the shuttle valve.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
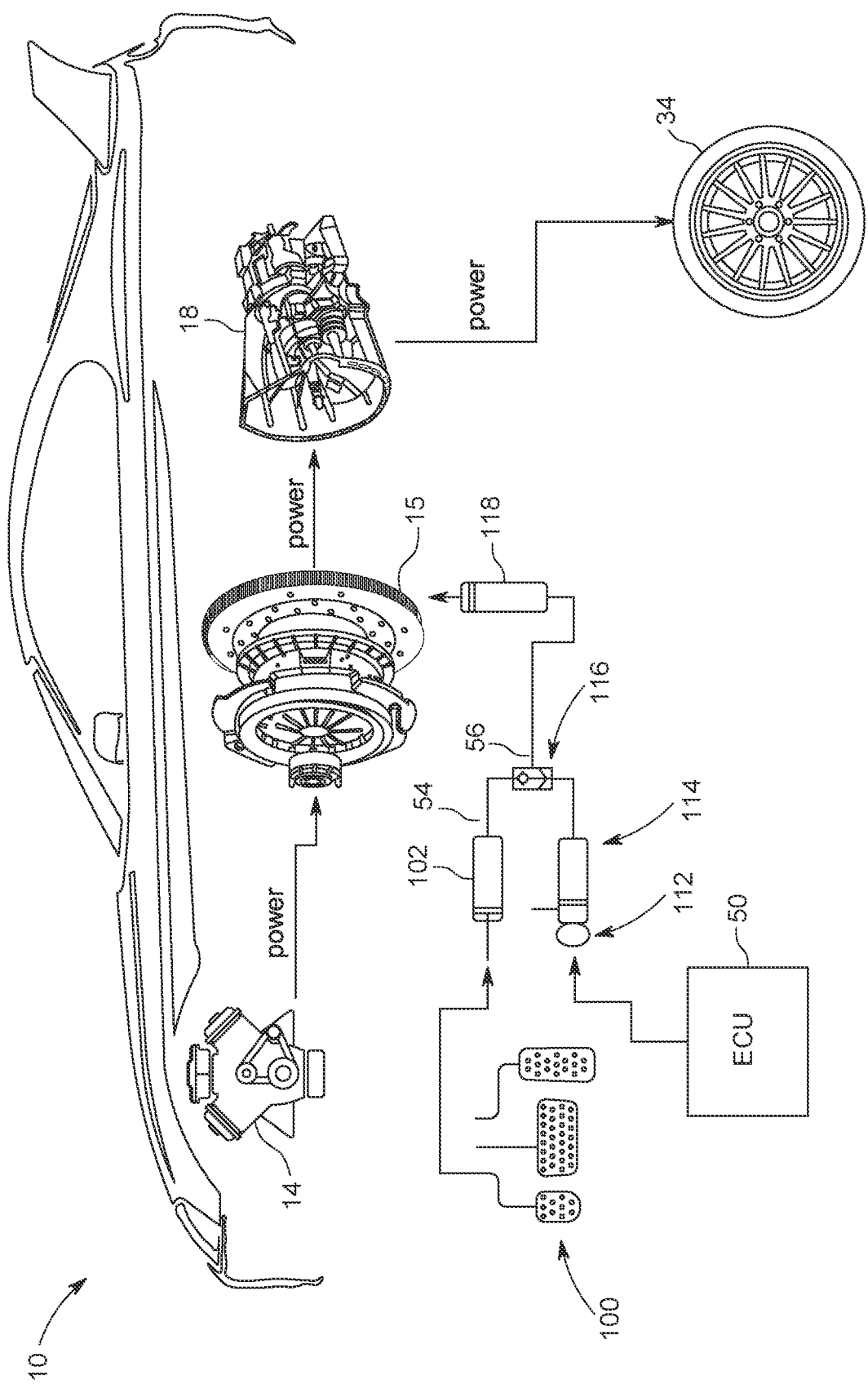
FIG. 1 is a schematic representation of a system architecture which may be used to blend control of clutch engagement between a driver of a vehicle and an electronic control unit of the vehicle.

The figures are not exhaustive and do not limit the present disclosure to the precise form disclosed.

DETAILED DESCRIPTION

In conventional manual transmission vehicles, a driver (or an electronic control unit) may interrupt the flow of power between the internal combustion engine (ICE) and the drivetrain of the vehicle by disengaging the clutch. Put another way, only when the clutch is engaged (partially or completely), will power from the ICE be transmitted to the drivetrain. There are a few ways to actuate engagement of the clutch in manual transmission vehicles. In traditional clutch actuation systems, a driver will operate a clutch pedal which is mechanically and/or hydraulically connected to the clutch. Clutch-by-wire is another type of clutch actuation system. In contrast to traditional clutch actuation systems, in clutch-by-wire systems, there is no mechanical/hydraulic connection between the clutch pedal and the clutch itself. Instead, an electronic sensor communicates the position of the clutch pedal (by wire) to an electronic control unit (ECU), and the ECU controls an actuator which engages/disengages the clutch.

One advantage that clutch-by-wire systems have over traditional mechanical/hydraulic clutch systems is that they enable automated and/or assisted clutch control in manual transmission vehicles. More specifically, because an ECU directly controls the actuator which engages/disengages the clutch, the ECU may (1) control clutch engagement completely autonomously, or (2) provide clutch control assistance to a driver who is operating the clutch pedal. For example, if a driver releases the clutch pedal too quickly after a gear change (which can cause the internal combustion engine to stall), the ECU may assist the driver by sending control signals to the clutch actuator to reengage the clutch more slowly (i.e. smooth out the gear change). In another example, a clutch-by-wire system may enable an "easy driving" or "city driving" mode where actuation of the clutch is fully automated. In this example, a driver may be able to switch to a "sport" mode when they want to take back manual control of the clutch (e.g. when they are driving on an open country road).

While the enablement of autonomous/assisted clutch control in manual transmission vehicles is a benefit of a clutch-by-wire system, clutch-by-wire systems have a few drawbacks. As alluded to above, without the traditional mechanical/hydraulic connection between the clutch pedal and operation of the clutch, clutch-by-wire systems lack the unique feel that many drivers associate with (and have come to love about) operating traditional manual transmission vehicles. Many driving enthusiasts enjoy operating manual transmission vehicles precisely because of the intimate mechanical connection they feel with the vehicle while driving. That connection is lessened with a clutch-by-wire system. Additionally, like with other drive-by-wire systems, clutch-by-wire systems can be less responsive to nuanced/precise driver operations than traditional mechanical systems.

Accordingly, embodiments of the technology disclosed herein are directed to systems and methods which enable automated/assisted clutch control, but preserve the familiar mechanical feeling that drivers of manual transmission vehicles are so fond of. As will be discussed in greater detail below, each of these embodiments involve blended control of the clutch (between driver and ECU) where the driver of the vehicle controls the clutch by compressing hydraulic fluid (e.g. the driver may press a foot pedal clutch connected to a piston in a hydraulic cylinder). In this way, the familiar mechanical feeling which drivers associate with operating a manual transmission vehicle is preserved. At the same time however, an ECU in the vehicle (which may be part of an autonomous driving system, or an emergency override system), may operate the clutch when a driver opts not to and/or fails to.

In specific embodiments of the disclosed technology, a shuttle valve may be used to blend control of clutch engagement between a driver of a vehicle and an ECU in the vehicle. In some embodiments, the clutch pedal may be mechanically connected to a piston in a first hydraulic cylinder (just like in a traditional mechanical/hydraulic clutch actuation system), and an ECU may actuate a second hydraulic cylinder. In these embodiments, the driver-actuated hydraulic cylinder and the ECU-actuated hydraulic cylinder may push hydraulic fluid into opposite inlets of a shuttle valve assembly. Accordingly, the shuttle valve assembly will allow the hydraulic fluid entering from the inlet with the greater pressure, to flow through an outlet to a third hydraulic cylinder. The fluid pressure in this third hydraulic cylinder may be translated through a mechanical linkage to the clutch. In this way, both the driver and the ECU are able to effectuate clutch engagement.

A first feature of the aforementioned system architecture is that the shuttle valve, by its mechanical design, will always allow the actuator (driver or ECU) providing the greater pressure to control engagement of the clutch. This means that the driver and ECU may override each other to disengage the clutch. Put another way, this system architecture provides a mechanical safety interlock for both the ECU and the driver. For the ECU, this facilitates autonomous emergency braking (i.e. if the driver is pushing on the accelerator, the ECU may step in and decouple the ICE from the transmission). For the driver, the mechanical safety interlock allows for emergency human/mechanical intervention if an autonomous/assisted driving system is driving the vehicle too fast or will not stop. This is an improvement over conventional clutch-by-wire systems which do not allow for mechanical human intervention which bypasses the ECU.

The fact that the shuttle valve will always allow the actuator (driver or ECU) providing the greater pressure to control engagement of the clutch allows for assisted clutch control. For example, if a driver releases the clutch pedal too quickly after a gear change, an ECU may assist by providing additional pressure in order to smooth out the gear change. Put another way, because the shuttle valve gives primacy to the greater pressure line, the ECU may smooth out reengagement of the clutch by providing more pressure than the driver. Further still, this feature enables fully automated clutch control by the ECU. Using this system architecture, an automated driving system may perform dynamic driving maneuvers which involve the clutch, such as clutch kicks and handbrake turns.

A second feature of this system architecture is the preservation of the familiar/natural feeling of a traditional mechanical-hydraulic-mechanical clutch actuation system. Specifically, the clutch pedal (and by extension the driver), has the same mechanical-hydraulic-mechanical connection to the clutch as it would in a traditional system. This produces the same feel and responsiveness that manual transmission enthusiasts have become accustomed to.

Figure 3:
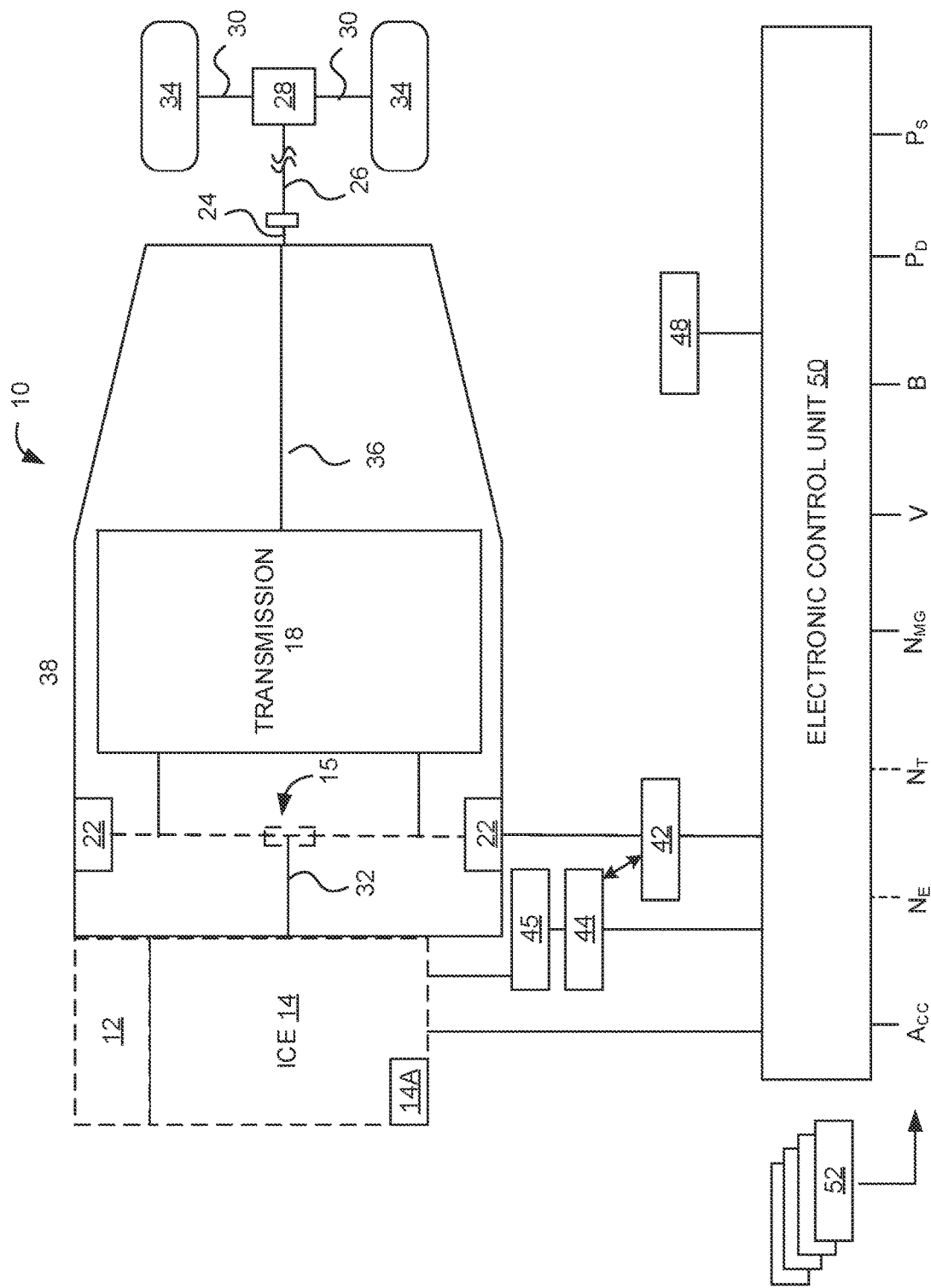
FIG. 3 is a schematic representation of an example hybrid vehicle with which embodiments of the systems and methods disclosed herein may be implemented.

The systems and methods disclosed herein may be implemented with any of a number of different vehicles and vehicle types. For example, the systems and methods disclosed herein may be used with automobiles, trucks, recreational vehicles and other vehicles like on- or off-road vehicles. Generally, the systems and methods disclosed herein may be implemented in any vehicle with a driver operated clutch (including vehicles without traditional manual transmissions). This may include vehicles with traditional foot pedal clutches, but it may also include vehicles where a driver operates a clutch by another means (e.g. a hand lever, a paddle shifter for clutch engagement, etc.). In addition, the principals disclosed herein may also extend to other vehicle types as well. An example hybrid electric vehicle (HEV) in which embodiments of the disclosed technology may be implemented is illustrated in FIG. 3. Although the example described with reference to FIG. 3 is a hybrid type of vehicle, the systems and methods for blending control of clutch engagement between a driver of a vehicle and an ECU in the vehicle can be implemented in other types of vehicle including gasoline-powered or diesel-powered vehicles, or other vehicles.

FIG. 1 illustrates an example system architecture which may be used to blend control of clutch engagement between a driver of a vehicle 10 and an ECU 50 of vehicle 10.

In the illustrated example a driver operated clutch pedal 100 is mechanically connected to a piston inside driver controlled hydraulic cylinder 102. While FIG. 1 illustrates a clutch pedal, in other embodiments, other interfaces of vehicle 10 may be used to move the piston in driver controlled hydraulic cylinder 102. For example, a hand lever, or an interface similar to a paddle shifter may be used to mechanically move the piston in driver controlled hydraulic cylinder 102.

As alluded to above, when a driver of vehicle 10 pushes clutch pedal 100 down, a piston inside driver controlled hydraulic cylinder 102 compresses fluid in the cylinder, building up fluid pressure. In this way, a driver of vehicle 10 is able to control the fluid pressure in driver controlled hydraulic cylinder 102, just as a driver would in a traditional mechanical/hydraulic clutch system. This fluid pressure may be transmitted to shuttle valve 116, via a hose or pipe connecting driver controlled hydraulic cylinder 102 and shuttle valve 116.

In the illustrated example, ECU 50 is connected by wire to ECU controlled actuator 112, which is mounted on ECU controlled hydraulic cylinder 114. In some embodiments, ECU controlled actuator 112 may be an electromechanical actuator which can receive command signals (e.g. CAN commands) from ECU 50, and in response to those command signals, mechanically move a piston in ECU controlled hydraulic cylinder 114. In other embodiments, ECU controlled actuator 112 may be an electro-hydraulic actuator which moves fluid in ECU controlled hydraulic cylinder 114 without moving a piston. Either way, ECU 50 is able to control the fluid pressure in ECU controlled hydraulic cylinder 114. This fluid pressure may be transmitted to shuttle valve 116, via a hose or pipe connecting ECU controlled hydraulic cylinder 114 and shuttle valve 116.

As alluded to above, shuttle valve 116 is a valve which allows fluid to flow through it from only one of two sources. More specifically, shuttle valve 116 has two inlets, on opposite ends of its manifold, and one outlet between the two inlets. A tube inside shuttle valve 116 connects these three openings. Inside the tube, between the two inlets, is a blocking element (e.g. a ball or shuttle). This blocking element, which is able to move freely inside the tube, is the mechanism by which shuttle valve 116 is able to allow fluid from only one of two sources to flow through its outlet. More specifically, when fluid enters shuttle valve 116 from opposing inlets, the greater pressure fluid will push the blocking element against the opposite inlet, effectively preventing fluid from that inlet from flowing through the outlet. In this way, shuttle valve 116 effectively acts as an "or" gate.

In the illustrated example, a first inlet of shuttle valve 116 allows fluid from driver controlled hydraulic cylinder 102 (connected to shuttle valve 116 by hose or pipe) to flow into shuttle valve 116. The second inlet of shuttle valve 116 allows fluid from ECU controlled hydraulic cylinder 114 (connected to shuttle valve 116 by hose or pipe) to flow into shuttle valve 116. The outlet of shuttle valve 116 connects to hydraulic cylinder 118 by hose or pipe. Accordingly, as described in the previous paragraph, shuttle valve 116 is able to act as an "or" gate between driver controlled hydraulic cylinder 102 and ECU controlled hydraulic cylinder 114. Put another way, only fluid from the greater pressure line will flow through the outlet of shuttle valve 116, and be transmitted to hydraulic cylinder 118. In this way, the illustrated system innovates a traditional mechanical/hydraulic clutch actuation system by enabling seamless automated/assisted clutch control by an ECU.

As alluded to above, hydraulic cylinder 118 may be connected by hose or pipe to the outlet of shuttle valve 116. Fluid flowing from the outlet of shuttle valve 116 may enter hydraulic cylinder 118, building up fluid pressure. This pressure may move a piston in hydraulic cylinder 118, which may be connected by mechanical linkage to clutch 15. This mechanical linkage may adjust the engagement of clutch 15. For example, the piston may be mechanically connected to a push rod, which acts on a clutch fork. The clutch fork may act (directly or indirectly) on the middle of a diaphragm spring in clutch 15. When the middle of the diaphragm spring is pushed in, clutch 15 may be partially, or completed disengaged. In this way, fluid pressure build up in hydraulic cylinder 118 may be translated into a mechanical force which disengages clutch 15.

As will be described in FIG. 3 below, clutch 15 may be used to engage and disengage ICE 14 from transmission 18. When engaged (or partially engaged) driving force generated by ICE 14 can be transmitted to one or more wheels 34 via clutch 15, transmission 18, a differential gear device 28 (not pictured), and a pair of axles 30 (not pictured).

In some embodiments vehicle 10 may also include pressure sensors 54 and 56. Pressure sensor 54 may obtain the fluid pressure transmitted from driver controlled hydraulic cylinder 102 to shuttle valve 116. Pressure sensor 54 may communicate the sensed pressure to ECU 50, by wire. Similarly, pressure sensor 56 may obtain the fluid pressure transmitted from shuttle valve 116 to hydraulic cylinder 118. This pressure may be used to monitor engagement of the clutch. Pressure sensor 56 may communicate the sensed pressure to ECU 50, by wire. In some embodiments, ECU 50 may use these sensed pressures to determine when/if to provide clutch control assistance to the driver of vehicle 10.

Finally, it should be understood that in the context of FIG. 1, a fluid is any substance that deforms (flows) under an applied pressure/force. For example, the fluid used in the illustrated system architecture may be liquid (e.g. water, mineral oil, etc.) or gaseous.

Figure 2:
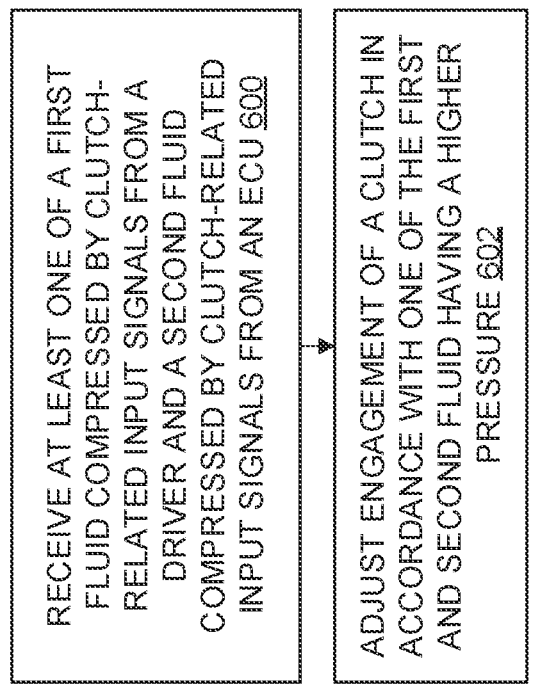
FIG. 2 illustrates an example method by which blended control of clutch engagement between a driver and ECU may be achieved.

FIG. 2 illustrates an example method by which blended control of clutch engagement between a driver and an ECU may be achieved. This method facilitates a number of system architectures (including the shuttle valve system architecture described above). For purposes of illustration, a few of these system architectures will be described in the paragraphs below.

In a first system architecture (i.e. the tandem/series system architecture), a driver controlled hydraulic cylinder and an ECU controlled hydraulic cylinder may be connected in series. More specifically, the outlet of an upstream hydraulic cylinder (either the driver controlled or ECU controlled hydraulic cylinder) may be connected to the inlet of a downstream hydraulic cylinder, and the outlet of the downstream hydraulic cylinder (the other of the driver controlled or ECU controlled hydraulic cylinder) may be connected to a hydraulic-mechanical linkage which adjusts engagement of a clutch based on fluid pressure. In some embodiments, the passage of fluid from the upstream hydraulic cylinder to the downstream hydraulic cylinder may be managed using a valve or seal which allows one way flow, such as a cone seal. For example, if the piston in the upstream hydraulic cylinder (e.g. the driver controlled hydraulic cylinder) is pushed, fluid from the upstream hydraulic cylinder may pass over a cone seal in the downstream hydraulic cylinder, and exit the outlet of the downstream hydraulic cylinder, thereby transferring the pressure of the fluid compressed in the upstream cylinder to the hydraulic-mechanical linkage which adjusts engagement of the clutch. If the piston in the downstream hydraulic cylinder (e.g. the ECU controlled hydraulic cylinder) is pushed, the fluid compressed in the downstream hydraulic cylinder may be transmitted directly to the hydraulic-mechanical linkage which adjusts engagement of the clutch. In this scenario, some fluid may enter the upstream cylinder to fill the void created by the fluid in the downstream hydraulic cylinder being compressed. In this way, pressure from either a first fluid compressed in the driver controlled hydraulic cylinder, or a second fluid compressed in the ECU controlled hydraulic cylinder, may be transmitted to the hydraulic-mechanical linkage which adjusts engagement of the clutch.

In a second system architecture, a driver controlled hydraulic cylinder and an ECU controlled hydraulic cylinder may each be part of parallel hydraulic systems which independently adjust engagement of the same clutch. For example, the driver controlled hydraulic cylinder may be connected to a first sub hydraulic-mechanical linkage configured to adjust clutch engagement based on the pressure of the fluid compressed in the driver controlled hydraulic cylinder (i.e. the first fluid). The ECU controlled hydraulic cylinder may be connected to a second sub hydraulic-mechanical linkage configured to adjust clutch engagement based on the pressure of the fluid compressed in the ECU controlled hydraulic cylinder (i.e. the second fluid). In some embodiments, the first and second hydraulic-mechanical linkages may comprise two concentric circles, each configured to push on the diaphragm spring of one clutch. Accordingly, by this mechanical design, the hydraulic-mechanical linkage which receives the greater pressure fluid (first or second) will control engagement of the clutch. In this way, as with the system architecture involving the shuttle valve, both driver and ECU may override the other to disengage the clutch by providing greater pressure.

A third system architecture which this method facilitates is the shuttle valve system architecture of FIG. 1. It should be understood that the illustrated method, as described in the paragraphs below, may facilitate system architectures in addition to those previously described.

At operation 600, a hydraulic-mechanical linkage may receive at least one of a first fluid compressed by clutch-related input signals from a driver of a vehicle, and a second fluid compressed by clutch-related input signals from an ECU in the vehicle.

The clutch-related input signals from a driver may include the driver pushing on a foot pedal (i.e. a clutch pedal) connected to a piston in a driver controlled hydraulic cylinder, which compresses the first fluid. In other embodiments, clutch-related input signals from the driver may comprise the driver manipulating other interfaces of the vehicle in order to compress the first fluid. For example, a driver may push/pull a hand-lever which mechanically moves the rotor of a fluid pump.

The clutch-related input signals from the ECU may include the ECU sending control signals to an electronic actuator which, in response to the control signals, compresses the second fluid in an ECU controlled hydraulic cylinder. In some embodiments, the ECU controlled actuator may be a an electromechanical actuator which, in response to received control signals, mechanically moves a piston in the ECU controlled hydraulic cylinder. In other embodiments, the ECU controlled actuator may be an electro-hydraulic actuator which compresses the second fluid in the ECU controlled hydraulic cylinder without moving a piston.

The hydraulic-mechanical linkage which does the receiving may include a piston inside a hydraulic cylinder, connected by mechanical linkage to the clutch. For example, in some embodiments, a piston in a hydraulic cylinder may be connected to a pushrod-clutch fork linkage. This pushrod-clutch fork linkage may act on the diaphragm spring of a clutch, which disengages the clutch when pushed. As alluded to above, in some embodiments, the hydraulic-mechanical linkage may comprise two sub hydraulic-mechanical linkages. For example, the hydraulic-mechanical linkage may comprise two pistons inside two separate hydraulic cylinders, each mechanically connected to an independent pushrod-clutch fork linkage. As described above, these two independent pushrod-clutch fork linkages may be concentric circles configured to push on the diaphragm spring of the same clutch based on fluid pressure.

The hydraulic-mechanical linkage which does the receiving may receive one of the first and second fluids, or both. For example, in the shuttle valve system architecture, the hydraulic mechanical linkage will only receive the fluid having the greater pressure. Accordingly, the hydraulic-mechanical linkage will adjust engagement of the clutch based on the pressure of the greater pressure fluid. Similarly, in the tandem/series architecture, the hydraulic-mechanical linkage will receive the fluid having the greatest pressure among (1) the first fluid (compressed by the driver), (2) the second fluid (compressed by the ECU), or in the rare case when both driver and ECU compress fluid at the same time, (3) a combination of the first fluid and the second fluid. Notably, even in the rare case where a combination of the first and second fluid is received by the hydraulic-mechanical linkage, the fluid having the higher pressure between the first and second fluid has been transmitted. Put another way, just like in the shuttle valve system architecture, driver and ECU may always override each other to disengage the clutch by providing greater pressure. Finally, in the system architecture involving two parallel/independent hydraulic systems, the hydraulic-mechanical linkage (i.e. the two sub hydraulic-mechanical linkages comprising concentric circles configured to push on the same clutch) may receive either one of, or both of, the first fluid and the second fluid. In the scenario where both the first and second fluid are received, by the mechanical design of this system, only the sub hydraulic-mechanical linkage which receives the fluid having the greater pressure will adjust the clutch.

At operation 602, the hydraulic-mechanical linkage may adjust engagement of a clutch in accordance with one of the first or second fluids having a greater pressure. As described earlier, in system architectures such as the shuttle valve architecture, where only the fluid having the greater pressure (first or second) can be received, the hydraulic-mechanical linkage will adjust engagement of the clutch according to the pressure of the received fluid. Similarly, in system architectures such as the series/tandem hydraulic system architecture, where the hydraulic-mechanical linkage will receive the fluid having the greatest pressure among (1) the first fluid; (2) the second fluid; or (3) a combination of the first fluid and the second fluid; the hydraulic-mechanical linkage will adjust engagement of the clutch according to the pressure of the received fluid. In system architectures such as the parallel/independent hydraulic system architecture, where a first fluid may be received by a first sub hydraulic-mechanical linkage and a second fluid may be received by a second sub hydraulic-mechanical linkage, the sub hydraulic-mechanical linkage which receives the fluid having the greater pressure may adjust engagement of the clutch in accordance with the pressure of the greater pressure fluid. In these ways, the hydraulic-mechanical linkage may adjust engagement of the clutch in accordance with one of the first or second fluids having a greater pressure.

FIG. 3 illustrates a drive system of a vehicle 10 that may include an internal combustion engine (ICE) 14 and one or more electric motors 22 (which may also serve as generators) as sources of motive power. Driving force generated by the ICE 14 and motors 22 can be transmitted to one or more wheels 34 via a clutch 15, a transmission 18, a differential gear device 28, and a pair of axles 30.

As an HEV, vehicle 10 may be driven/powered with either or both of ICE 14 and the motor(s) 22 as the drive source for travel. For example, a first travel mode may be an engine-only travel mode that only uses ICE 14 as the source of motive power. A second travel mode may be an EV travel mode that only uses the motor(s) 22 as the source of motive power. A third travel mode may be an HEV travel mode that uses ICE 14 and the motor(s) 22 as the sources of motive power. In the engine-only and HEV travel modes, vehicle 10 relies on the motive force generated at least by ICE 14, and a clutch 15 may be included to engage ICE 14. In the EV travel mode, vehicle 10 is powered by the motive force generated by motor 22 while ICE 14 may be stopped and clutch 15 disengaged.

ICE 14 can be an internal combustion engine such as a gasoline, diesel or similarly powered engine in which fuel is injected into and combusted in a combustion chamber. A cooling system 12 can be provided to cool the ICE 14 such as, for example, by removing excess heat from ICE 14. For example, cooling system 12 can be implemented to include a radiator, a water pump and a series of cooling channels. In operation, the water pump circulates coolant through the ICE 14 to absorb excess heat from the ICE. The heated coolant is circulated through the radiator to remove heat from the coolant, and the cold coolant can then be recirculated through the ICE. A fan may also be included to increase the cooling capacity of the radiator. The water pump, and in some instances the fan, may operate via a direct or indirect coupling to the driveshaft of ICE 14. In other applications, either or both the water pump and the fan may be operated by electric current such as from battery 44.

An output control circuit 14A may be provided to control drive (output torque) of ICE 14. Output control circuit 14A may include a throttle actuator to control an electronic throttle valve that controls fuel injection, an ignition device that controls ignition timing, and the like. Output control circuit 14A may execute output control of ICE 14 according to a command control signal(s) supplied from an electronic control unit 50, described below. Such output control can include, for example, throttle control, fuel injection control, and ignition timing control.

Motor 22 can also be used to provide motive power in vehicle 10 and may be powered electrically via a battery 44. More specifically, motor 22 can be powered by battery 44 to generate motive force to move the vehicle and adjust vehicle speed. Motor 22 can also function as a generator to generate electrical power such as, when coasting or braking. Motor 22 may be connected to battery 44 via an inverter 42. Battery 44 may also be used to power other electrical or electronic systems in the vehicle. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

As described above, clutch 15 can be included to engage and disengage ICE 14 from the drivetrain of the vehicle. In the illustrated example, a crankshaft 32, which is an output member of ICE 14, may be selectively coupled to the motor 22 via clutch 15. However, in other embodiments (e.g. mild hybrids), motors 22 may be coupled directly to wheels 34, and may provide primary or supplemental power to the wheels during acceleration. Clutch 15 can be implemented as, for example, a multiple disc type hydraulic frictional engagement device, where engagement can be controlled in the manner described above. Clutch 15 may be controlled such that its engagement state is complete engagement, partial/slip engagement, and complete disengagement, depending on the pressure applied to the clutch. For example, a torque capacity of clutch 15 may be controlled according to the hydraulic pressure supplied from the hydraulic control circuit described in FIG. 1. As described above, when clutch 15 is engaged, power transmission is provided in the power transmission path between the crankshaft 32 and transmission 18. On the other hand, when clutch 15 is disengaged, motive power from ICE 14 is not delivered to transmission 18. In a partial/slip engagement state, clutch 15 is engaged, and motive power is provided to transmission 18 according to a torque capacity (transmission torque) of the clutch 15.

As alluded to above, vehicle 10 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a clutch control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 3, electronic control unit 50 receives information from a plurality of sensors included in vehicle 10. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, $N_V$. As discussed in FIG. 1, these may also include the pressure of the hydraulic fluid flowing out of driver controlled hydraulic cylinder 102, $P_D$, pressure of the hydraulic fluid flowing out the outlet of the shuttle valve 116, $P_S$, and brake operation amount/pressure, B. Accordingly, vehicle 10 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

Figure 4:
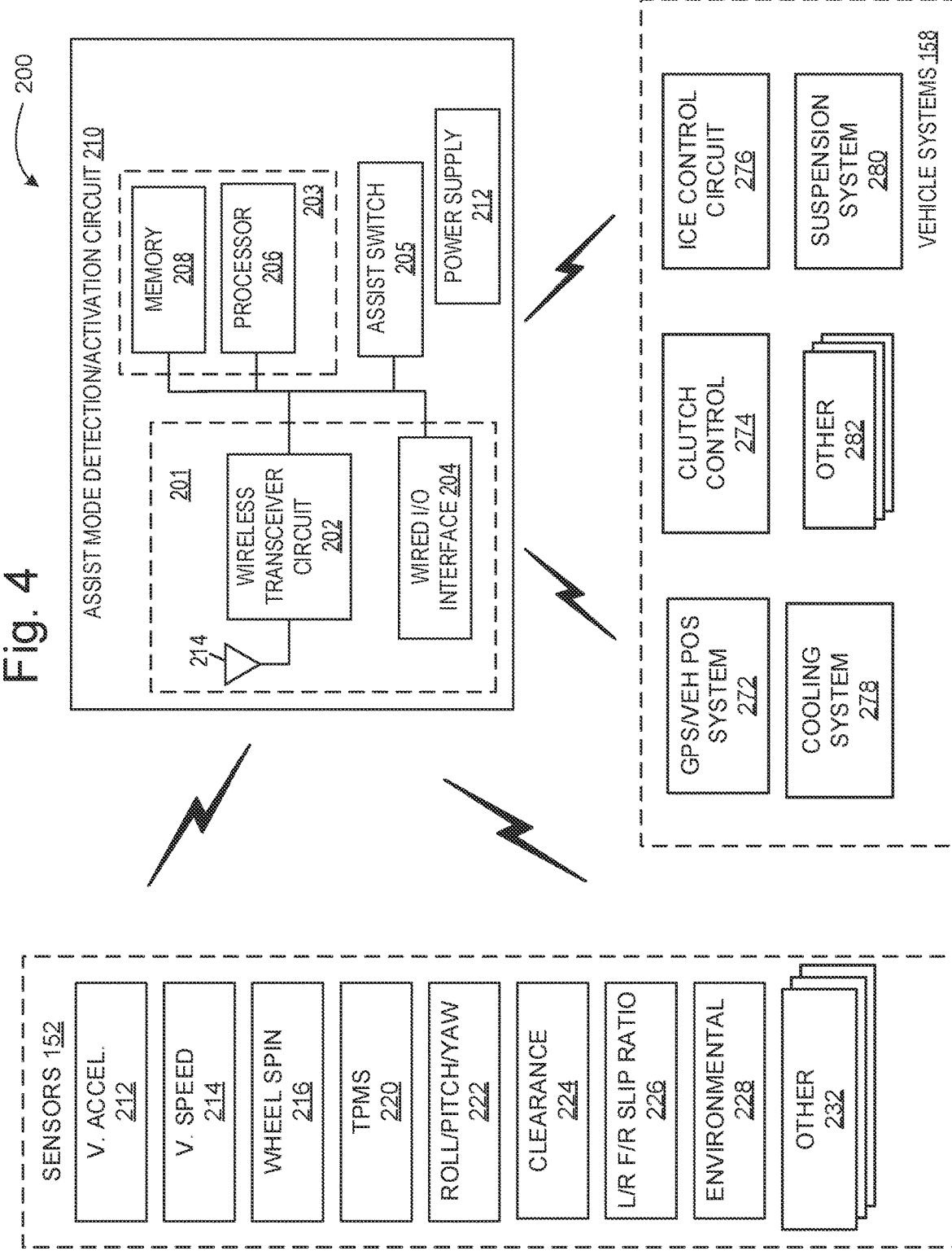
FIG. 4 illustrates an example architecture for detecting clutch engagement and entering an assist mode in accordance with one embodiment of the systems and methods described herein.

FIG. 4 illustrates an example architecture for detecting (1) driver clutch control operations, (2) engagement of the clutch, and (3) overall vehicle operating conditions, and entering an assist mode in accordance with one embodiment of the systems and methods described herein. Referring now to FIG. 4, in this example, assist mode detection and activation system 200 includes an assist-mode detection/activation circuit 210, a plurality of sensors 152, and a plurality of vehicle systems 158. Sensors 152 and vehicle systems 158 can communicate with assist-mode detection/activation circuit 210 via a wired or wireless communication interface. Although sensors 152 and vehicle systems 158 are depicted as communicating with assist-mode detection/activation circuit 210, they can also communicate with each other as well as with other vehicle systems. Assist-mode detection/activation circuit 210 can be implemented as an ECU or as part of an ECU such as, for example electronic control unit 50. In other embodiments, assist-mode detection/activation circuit 210 can be implemented independently of the ECU.

Assist-mode detection/activation circuit 210 in this example includes a communication circuit 201, a decision circuit (including a processor 206 and memory 208 in this example) and a power supply 212. Components of assist-mode detection/activation circuit 210 are illustrated as communicating with each other via a data bus, although other communication in interfaces can be included. Assist-mode detection/activation circuit 210 in this example also includes a manual assist switch 205 that can be operated by the user to manually select the assist mode.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions that may be used by the processor 206 to assist-mode detection/activation circuit 210.

Although the example of FIG. 4 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a assist-mode detection/activation circuit 210.

Communication circuit 201 either or both a wireless transceiver circuit 202 with an associated antenna 214 and a wired I/O interface 204 with an associated hardwired data port (not illustrated). As this example illustrates, communications with assist-mode detection/activation circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to CLUTCH transceiver circuit 202 and is used by wireless transceiver circuit 202 to transmit radio signals wirelessly to wireless equipment with which it is connected and to receive radio signals as well. These RF signals can include information of almost any sort that is sent or received by assist-mode detection/activation circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 210 can include one or more of a battery or batteries (such as, e.g., Li-ion, Li-Polymer, NiMH, NiCd, NiZn, and NiH$_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 152 can include, for example, sensors 52 such as those described above with reference to the examples of FIG. 3. Sensors 152 can include additional sensors that may or not otherwise be included on a standard vehicle 10 with which the turn assist-mode system 200 is implemented. In the illustrated example, sensors 152 include vehicle acceleration sensors 212, vehicle speed sensors 214, wheelspin sensors 2116 (e.g., one for each wheel), a tire pressure monitoring system (TPMS) 220, accelerometers such as a 3-axis accelerometer 222 to detect roll, pitch and yaw of the vehicle, vehicle clearance sensors 224, left-right and front-rear slip ratio sensors 226, and environmental sensors 228 (e.g., to detect salinity or other environmental conditions). Additional sensors 232 can also be included as may be appropriate for a given implementation of assist-mode system 200. For example, additional sensors which sense (1) the hydraulic fluid pressure transmitted from driver controlled hydraulic cylinder 102 to shuttle valve 116 and (2) the hydraulic fluid pressure transmitted from shuttle valve 116 to hydraulic cylinder 118, may be included. Information from these sensors may be used to monitor (1) driver clutch control operations, and (2) engagement of the clutch.

Vehicle systems 158 can include any of a number of different vehicle components or subsystems used to control or monitor various aspects of the vehicle and its performance. In this example, the vehicle systems 158 include a GPS or other vehicle positioning system 272; clutch control system 274 to control engagement of the clutch; engine control circuits 276 to control the operation of engine (e.g. Internal combustion engine 14); cooling systems 278 to provide cooling for the motors, power electronics, the engine, or other vehicle systems; suspension system 280 such as, for example, an adjustable-height fluid suspension system, and other vehicle systems.

During operation, assist mode detection/activation circuit 210 can receive information from various vehicle sensors to determine whether the assist mode should be activated. Also, the driver may manually activate the assist mode by operating assists which 205. Communication circuit 201 can be used to transmit and receive information between assist-mode detection/activation circuit 210 and sensors 152, and assist-mode detection/activation circuit 210 and vehicle systems 158. Also, sensors 152 may communicate with vehicle systems 158 directly or indirectly (e.g., via communication circuit 201 or otherwise).

In various embodiments, communication circuit 201 can be configured to receive data and other information from sensors 152 that is used in determining whether to activate the assist mode. Additionally, communication circuit 201 can be used to send an activation signal or other activation information to various vehicle systems 158 as part of entering the assist mode. For example, as described in more detail below, communication circuit 201 can be used to send signals to, for example, one or more of: clutch control system 274 to control engagement of the clutch (e.g. to disengage the clutch during emergency braking); motor controllers 276 to, for example, control motor torque, motor speed of the various motors in the system; ICE control circuit 276 to, for example, control power to engine 14 (e.g., to shut down the engine so all power goes to the rear motors, to ensure the engine is running to charge the batteries or allow more power to flow to the motors); cooling system 278 (e.g., to increase cooling system flow for one or more motors and their associated electronics); suspension system 280 (e.g., to increase ground clearance such as by increasing the ride height using the fluid suspension). The decision regarding what action to take via these various vehicle systems 158 can be made based on the information detected by sensors 152. Examples of this are described in more detail below.

Figure 5:
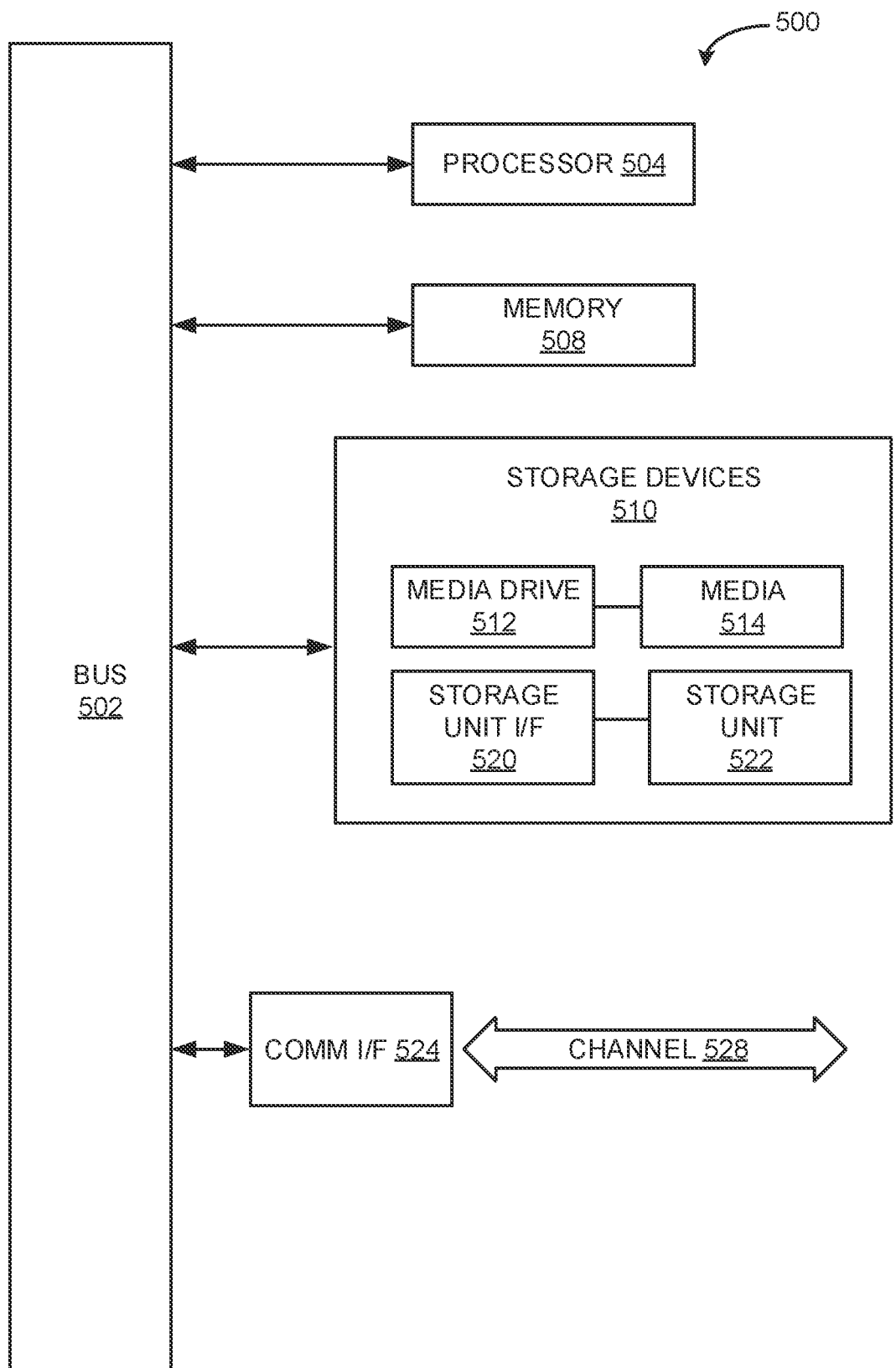
FIG. 5 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing system 500 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment, such as for example, one or more of the elements or circuits illustrated in FIGS. 3 and 4 and described herein. Computing system 500 might also represent computing capabilities embedded within or otherwise available to a given device. For example, a computing system might be found in other electronic devices such as, for example, digital cameras, navigation systems, cellular telephones, portable computing devices, modems, routers, WAPs, terminals and other electronic devices that might include some form of processing capability.

Computing system 500 might include, for example, one or more processors, controllers, control modules, or other processing devices, such as a processor 504. Processor 504 might be implemented using a general-purpose or special-purpose processing engine such as, for example, a microprocessor (whether single-, dual- or multi-core processor), signal processor, graphics processor (e.g., GPU) controller, or other control logic. In the illustrated example, processor 504 is connected to a bus 502, although any communication medium can be used to facilitate interaction with other components of computing system 500 or to communicate externally.

Computing system 500 might also include one or more memory modules, simply referred to herein as main memory 508. For example, in some embodiments random access memory (RAM) or other dynamic memory, might be used for storing information and instructions to be executed by processor 504. Main memory 508 might also be used for storing temporary variables or other intermediate information during execution of instructions to be executed by processor 504. Computing system 500 might likewise include a read only memory ("ROM") or other static storage device coupled to bus 502 for storing static information and instructions for processor 504.

The computing system 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a floppy disk drive, a magnetic tape drive, an optical disk drive, a CD or DVD drive (R or RW), a flash drive, or other removable or fixed media drive might be provided. Accordingly, storage media 514 might include, for example, a hard disk, a floppy disk, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing system 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory module) and memory slot, a flash drive and associated slot (for example, a USB drive), a PCMCIA slot and card, and other fixed or removable storage units 522 and interfaces 520 that allow software and data to be transferred from the storage unit 522 to computing system 500.

Computing system 500 might also include a communications interface 524. Communications interface 524 might be used to allow software and data to be transferred between computing system 500 and external devices. Examples of communications interface 524 might include a modem or softmodem, a network interface (such as an Ethernet, network interface card, WiMedia, IEEE 802.XX, Bluetooth® or other interface), a communications port (such as for example, a USB port, IR port, RS232 port, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing system 500 to perform features or functions of the disclosed technology as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
    receiving, at a hydraulic-mechanical linkage, at least one of a first fluid compressed by clutch-related input signals from a driver of a vehicle, and a second fluid compressed by clutch-related input signals from an ECU in the vehicle; and
    adjusting, by the hydraulic-mechanical linkage, engagement of a clutch in accordance with one of the first or second fluids having a greater pressure;
    wherein when both the first fluid and the second fluid are compressed simultaneously, engagement of the clutch is adjusted in accordance with one of the first or second fluids having the greater pressure.

2. The method of claim 1, wherein the clutch-related input signals from the driver comprise the driver pushing a clutch pedal which is mechanically connected to a piston in a driver controlled hydraulic cylinder.

3. The method of claim 2, wherein the clutch-related input signals from the ECU comprise the ECU sending control signals to an electronic actuator configured to, in response to the control signals, compress fluid in an ECU controlled hydraulic cylinder.

4. The method of claim 3, wherein:
    receiving, at the hydraulic-mechanical linkage comprises, receiving at least one of:
        at a first sub hydraulic-mechanical linkage, the first fluid; and at a second sub hydraulic-mechanical linkage, the second fluid; and adjusting, by the hydraulic-mechanical linkage comprises, adjusting by the sub hydraulic-mechanical linkage which receives the fluid having the greater pressure, engagement of the clutch in accordance with the greater pressure.

5. The method of claim 4, wherein:

the first sub hydraulic-mechanical linkage comprises a first concentric circle configured to push on a diaphragm spring of the clutch based on the pressure of the first fluid; and the second sub hydraulic-mechanical linkage comprises a second concentric circle, having a different diameter than the first concentric circle, configured to push on the diaphragm spring of the clutch based on the pressure of the second fluid.

6. A vehicle system comprising:

a clutch;

an electronic control unit (ECU); and a shuttle valve, the shuttle valve comprising first and second inlets and an outlet, wherein the shuttle valve operates to:

in response to receiving clutch-related input signals from a driver of the vehicle and the ECU, routing fluid to the first and second inlets of the shuttle valve respectively, route the fluid from the greater pressure source through the outlet, to a piston in a hydraulic cylinder which adjusts, by a mechanical linkage, engagement of the clutch based on fluid pressure; and in response to receiving clutch-related input signals from the driver of the vehicle and the ECU simultaneously, routing fluid to the first and second inlets of the shuttle valve simultaneously, route the fluid from the greater pressure source through the outlet, to the piston in the hydraulic cylinder which adjusts, by the mechanical linkage, engagement of the clutch based on the fluid pressure.

7. The vehicle system of claim 6, wherein the clutch-related input signals from the driver comprise the driver pushing a clutch pedal which is mechanically connected to a piston in a driver controlled hydraulic cylinder.

8. The vehicle system of claim 7, wherein the clutch-related input signals from the ECU comprise the ECU sending control signals to an electronic actuator configured to, in response to the control signals, compress fluid in an ECU controlled hydraulic cylinder.

9. The vehicle system of claim 6, further comprising:

a first pressure sensor which communicates, to the ECU, the pressure of the fluid routed to the first inlet of the shuttle valve; and a second pressure sensor which communicates, to the ECU, the pressure of the fluid routed through the outlet of the shuttle valve.

10. A method comprising:

receiving, by a hydraulic-mechanical linkage, fluid routed from an outlet of a shuttle valve;

wherein the fluid routed from the outlet of shuttle valve is the greater pressure of:

a first fluid, routed by clutch-related signals from a driver of the vehicle, into a first inlet of the shuttle valve; and a second fluid, routed by clutch-related signals from an ECU in the vehicle, into a second inlet of the shuttle valve; and adjusting, by the hydraulic-mechanical linkage, engagement of a clutch in the vehicle based on the pressure of the received fluid;

wherein when both the first fluid and the second fluid are compressed simultaneously, engagement of the clutch is adjusted in accordance with one of the first or second fluids having the greater pressure.

11. The method of claim 10, wherein the clutch-related inputs from the driver comprise the driver pushing a clutch pedal which is mechanically connected to a piston in a driver controlled hydraulic cylinder.

12. The method of claim 11, wherein the clutch-related input signals from the ECU comprise control signals sent to an electronic actuator configured to, in response to the control signals, compress fluid in an ECU controlled hydraulic cylinder.

* * * * *